United States Patent [19]
Morris

[11] 3,809,435
[45] May 7, 1974

[54] FRICTION KEEPERS FOR WHEELS AND STRUCTURES UTILIZING THEM

[76] Inventor: James C. Morris, 140 Lincoln, Ashland, Oreg. 97520

[22] Filed: Mar. 23, 1973

[21] Appl. No.: 344,253

[52] U.S. Cl............. 301/112, 301/122, 308/237 A
[51] Int. Cl...................... B60b 37/10, F16c 27/00
[58] Field of Search .......... 301/1, 5.3, 63 PW, 111, 301/112, 122; 308/DIG. 7, 237 R, 237 A, 238; 46/221; 403/261, 344, 345, 360

[56] References Cited
UNITED STATES PATENTS

| | | | |
|---|---|---|---|
| 1,748,198 | 2/1930 | Wormer | 308/237 R |
| 2,291,557 | 7/1942 | Parrish | 301/112 |
| 3,033,623 | 5/1962 | Thomson | 308/DIG. 7 |
| 3,248,154 | 4/1966 | Waters | 301/111 |

Primary Examiner—Robert S. Ward, Jr.
Assistant Examiner—U. N. Sakran

[57] ABSTRACT

In toy structures such as model aircraft, for example, the problem of quickly, dependably and inexpensively securing and sustaining a wheel in place with freedom for rotation on a fixed bearing shaft in substantially a fixed radial plane of the shaft, is solved by the provision of an integral plate-and-sleeve device which is slit along a radial plane. The internal sleeve diameter is made small enough so that it requires enlarging deformation within its elastic limit in order to be fitted onto the shaft. The expanded sleeve portion firmly grips the shaft for retaining the wheel in place, while the plate portion guides the wheel, being effective, if necessary, to prevent or sharply limit wobbling of the wheel. Two of these devices, placed sleeve to sleeve, may combine not only to retain and guide a wheel, but also to serve jointly as a bearing for it.

8 Claims, 4 Drawing Figures

PATENTED MAY 7 1974　　　　　　　　　　　　　　3,809,435

FRICTION KEEPERS FOR WHEELS AND STRUCTURES UTILIZING THEM

This invention relates to convenient and effective means for consistently controlling the position and true operation of a wheel rotatably mounted on a shaft. It is generally applicable to carts and other wheeled vehicles which are shipped in kit form and assembled by the recipient. It was originally contrived for use in the toy field, specifically for use in connection with the undercarriages of model aircraft, but it is by no means limited in its utility to model aircraft, to toys in general, or even to merchandise involving one or more wheel and shaft combinations and sold in knock-down or kit form.

Desirably, the sleeve portion is internally beveled at one or both of its ends to facilitate its expansion by the mere thrusting of it onto the shaft. Alternatively or additionally, the shaft end may be beveled.

The utility of the device is not confined to initial assembly, and the retaining of the wheel dependably in place. Since the device is held on the shaft by friction, it may be readily withdrawn for removal of a damaged wheel and replaced after the same wheel, repaired, or a substitute wheel, has been put in place.

Other objects and advantages will hereinafter appear.

In the drawing forming part of this specification,

All of the figures are drawn on a uniform, enlarged scale.

Figure 1:
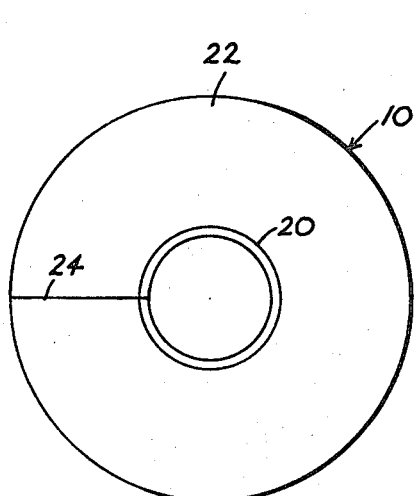
FIG. 1 is a view in side elevation of a practical and advantageous wheel retaining device illustrative of the invention.
Figure 2:
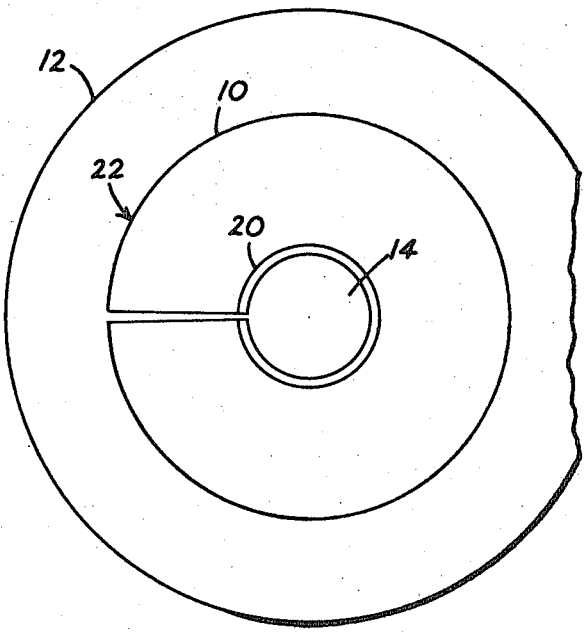
FIG. 2 is a fragmentary end view in elevation, showing the novel wheel retaining device in place on a fixed axle or shaft and holding a rotatable wheel in an assigned position on the shaft.
Figure 3:
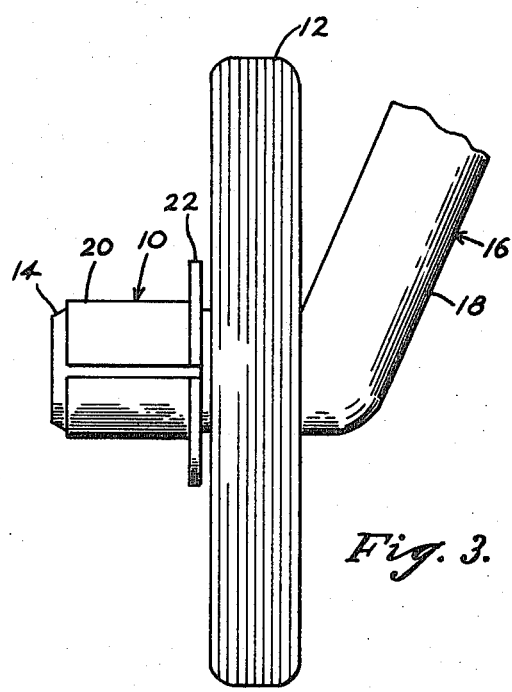
FIG. 3 is a fragmentary view in front elevation of the structure shown in FIG. 2.

For illustrative purposes, a device 10 of FIG. 1 is shown in FIGS. 2 and 3 as used for securing a wheel 12 in place on a horizontal shaft 14, which shaft may form an unitary part of the undercarriage 16 of a model airplane. The portion of the undercarriage shown includes not only the horizontal shaft 14, but an upwardly inclined arm 18 which determines the rightward limit of movement of the wheel on the shaft as seen in FIG. 3.

The novel retaining device 10 comprises a sleeve portion 20 which is circular in cross-section and a flange or plate portion 22 which desirably, but not necessarily, extends at right angles to the axis of the sleeve portion. The plate portion is shown as circular in form, but this is not essential. As seen in FIG. 1 the sleeve portion and the plate portion are slit in a common, radial plane as indicated by the line 24. The slit may be so narrow that, as indicated in FIG. 1, it can only be indicated by a single line. This is not an essential characteristic, however. The separation could amount to a slot or sector of quite substantial width. What is essential is that the internal diameter of the sleeve portion shall be slightly smaller than the external diameter of the shaft upon which it is to be placed. The relationship should be such that the sleeve portion is required to be enlarged slightly, within its elastic limit, to accept the shaft and grip it. This fact is indicated in FIG. 2 by the enlargement of the slit in FIG. 2 to a substantial width.

When the device is intended for the service illustrated in FIGS. 2 and 3, it is desirable either for the end of shaft 14 to be slightly beveled, and/or for the internal surface of the sleeve to be slightly beveled at one end for a short distance, so that the enlargement of the sleeve can be effected by a camming action in response to pressure applied to the device in the direction of the shaft axis.

If the wheel hub is broad and of uniform diameter, as shown, there is no need for any greater contact with the right hand side of the wheel than that afforded by the upwardly inclined arm 18, since the extensive contact of the wheel hub with the shaft will cause the wheel to run true, and free from wobble. In such a case, the plate portion 22 could be reduced to a narrow flange.

Figure 4:
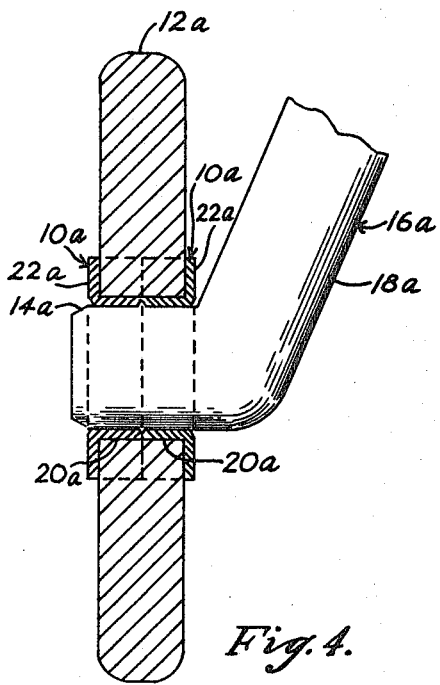
FIG. 4 is a view in partial section similar to FIG. 3 but showing two of the devices in confronting relation at opposite sides of a wheel and jointly forming a bearing upon which the wheel turns.

An alternative structure is illustrated in FIG. 4 in which two devices 10a, generally like the device 10, are shown as employed on a frame 16a like the frame 16 in connection with a wheel 12a like the wheel 12.

In this instance the sleeve portions 20a of the devices 10a extend between the hub of wheel 12a and the shaft 14a to serve as a fixed bearing for the wheel. They may abut one another as shown, although this is not an essential condition.

Although the dimensions of the wheel and shaft are shown in FIG. 4 to be the same as shown in FIGS. 2 and 3, a combination like that of FIG. 4 is well adapted for very short shafts and for very narrow wheels, because of the extensive lateral support which may be provided at opposite sides of the wheel.

I have described what I believe to be the best embodiment of my invention. What I desire to cover by letters patent, however, is set forth in the appended claims.

I claim:

1. A novel device for positioning and retaining a wheel on a fixed shaft with freedom for rotation relative to the shaft, comprising, in combination, a sleeve portion and a flange portion integral therewith, said portions having a common slot which permits the device to be enlarged under strain within its elastic limit to accept and firmly grip what would otherwise be an oversize shaft.

2. A novel device as set forth in claim 1 in which the common slot lies in a common plane.

3. A novel device as set forth in claim 1 in which the common slot lies in a radial plane.

4. A novel device as set forth in claim 1 in which the sleeve portion is internally beveled at at least one of its ends.

5. The combination with a fixed shaft and a wheel rotatably mounted thereon, of at least one integral, slotted device having a sleeve portion, expanded within its elastic limit, which firmly grips the shaft, and a flange portion which serves as a stop for restricting movement of the wheel lengthwise of the shaft.

6. The combination as set forth in claim 5 which includes two of the integral, slotted devices mounted in shaft gripping relation on the shaft at opposite sides of the wheel.

7. The combination as set forth in claim 6 in which the sleeve portions of the integral, slotted devices extend toward one another between the exterior of the shaft and the interior of the wheel, and jointly form a bearing for the wheel.

8. The combination as set forth in claim 5 in which the shaft is beveled at its wheel-receiving end to facilitate application of the integral slotted device.

* * * * *